US006964154B1

(12) United States Patent
Sackheim et al.

(10) Patent No.: US 6,964,154 B1
(45) Date of Patent: Nov. 15, 2005

(54) AXISYMMETRIC, THROTTLEABLE NON-GIMBALLED ROCKET ENGINE

(75) Inventors: Robert L. Sackheim, Madison, AL (US); John J. Hutt, Decatur, AL (US); William E. Anderson, West Lafayette, IN (US); Gordon A. Dressler, Manhattan Beach, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/390,253

(22) Filed: Mar. 11, 2003

(51) Int. Cl.[7] ............................ F02K 3/00; F02K 7/00; F02K 9/00; F02K 9/74; F02K 9/76

(52) U.S. Cl. ............................ 60/224; 60/257; 60/258; 60/770

(58) Field of Search .......................... 60/224, 257, 258, 60/263, 200.1, 225, 250, 770, 228, 230, 243; 239/265.17, 265.19

(56) References Cited

U.S. PATENT DOCUMENTS

| | | | | |
|---|---|---|---|---|
| 2,661,691 A * | 12/1953 | Brandt | 244/3.23 |
| 3,112,612 A * | 12/1963 | Berman et al. | 60/228 |
| 3,150,485 A * | 9/1964 | Hickerson | 60/258 |
| 3,151,446 A * | 10/1964 | Parilla | 60/219 |
| 3,170,287 A * | 2/1965 | Adelman | 60/224 |
| 3,180,086 A * | 4/1965 | Ernst et al. | 60/253 |
| 3,192,714 A * | 7/1965 | Hickerson | 60/230 |
| 3,198,459 A * | 8/1965 | Geary | 244/73 R |
| 3,311,130 A * | 3/1967 | Caldwell | 137/869 |
| 3,358,453 A * | 12/1967 | Swet | 60/225 |
| 3,490,238 A * | 1/1970 | Capps et al. | 60/258 |
| 3,595,022 A * | 7/1971 | Radebold et al. | 60/258 |
| 3,788,069 A * | 1/1974 | Schmidt | 60/207 |
| 3,817,029 A * | 6/1974 | Frisch | 376/318 |
| 4,650,139 A * | 3/1987 | Taylor et al. | 244/161 |
| 4,923,152 A * | 5/1990 | Barkats | 244/172 |
| 4,936,091 A | 6/1990 | Schoenman | |
| 5,201,832 A * | 4/1993 | Porter et al. | 244/158 R |
| 5,513,489 A * | 5/1996 | Bussing | 60/39.38 |
| 5,622,046 A | 4/1997 | Michaels et al. | |
| 5,873,240 A * | 2/1999 | Bussing et al. | 60/207 |
| 6,003,301 A * | 12/1999 | Bratkovich et al. | 60/204 |
| 6,135,393 A * | 10/2000 | Sackheim et al. | 244/169 |
| 6,170,258 B1 * | 1/2001 | Katorgin et al. | 60/257 |
| 6,185,927 B1 * | 2/2001 | Chrones et al. | 60/258 |
| 6,205,770 B1 | 3/2001 | Williams et al. | |
| 6,213,431 B1 * | 4/2001 | Janeke | 244/172 |
| 6,220,016 B1 | 4/2001 | Defever et al. | |

(Continued)

*Primary Examiner*—William H. Rodriguez
(74) *Attorney, Agent, or Firm*—James J. McGroary; Ross F. Hunt, Jr.

(57) ABSTRACT

A rocket engine assembly is provided for a vertically launched rocket vehicle. A rocket engine housing of the assembly includes two or more combustion chambers each including an outlet end defining a sonic throat area. A propellant supply for the combustion chambers includes a throttling injector, associated with each of the combustion chambers and located opposite to sonic throat area, which injects the propellant into the associated combustion chamber. A modulator, which may form part of the injector, and which is controlled by a controller, modulates the flow rate of the propellant to the combustion chambers so that the chambers provide a vectorable net thrust. An expansion nozzle or body located downstream of the throat area provides expansion of the combustion gases produced by the combustion chambers so as to increase the net thrust.

7 Claims, 3 Drawing Sheets

U.S. PATENT DOCUMENTS

| | | | | |
|---|---|---|---|---|
| 6,293,091 | B1 * | 9/2001 | Seymour et al. | 60/225 |
| 6,311,477 | B1 * | 11/2001 | Schneider | 60/218 |
| 6,499,287 | B1 * | 12/2002 | Taylor | 60/204 |
| 6,516,605 | B1 * | 2/2003 | Meholic | 60/247 |
| 6,530,543 | B2 * | 3/2003 | Redding et al. | 244/162 |
| 6,591,603 | B2 * | 7/2003 | Dressler et al. | 60/258 |
| 6,620,519 | B2 * | 9/2003 | Modi | 428/450 |
| 6,629,416 | B1 * | 10/2003 | Johnson | 60/770 |
| 6,685,141 | B2 * | 2/2004 | Penn | 244/162 |
| 2004/0079072 | A1 * | 4/2004 | Shumate | 60/204 |

* cited by examiner

AXISYMMETRIC, THROTTLEABLE NON-GIMBALLED ROCKET ENGINE

ORIGIN OF THE INVENTION

The invention described herein was made in part by employees of the United States Government and may be manufactured and used by and for the Government of the United States for governmental purposes without the payment of any royalties thereon or therefore.

FIELD OF THE INVENTION

The present invention relates to rocket engines and, more particularly, to an improved rocket engine which eliminates the complexity of gimballing a large engine mass.

BACKGROUND OF THE INVENTION

Differential throttling has been used in the past for expendable launch vehicles having a multiple engine configuration and for linear aerospike engines designed for use in horizontal take-off, reusable launchers. An example of the latter is the X-33/VentureStar. However, to our knowledge, differential throttling has not been applied to vertical launch, single engine aerospike configurations despite the potential advantage. It appears that an important reason for this concerns the problems associated with thrust vector control and the combustion instability issues associated with the symmetrical annular combustors required by the current state of the art.

Patented prior art of potential interest includes U.S. Pat. No. 6,213,431 to Janeke which discloses a sonic aerospike rocket engine having a first fuel injector which is located at the leading end and which directs a first fuel towards the reaction plane. A second fuel injector is located in between the leading end and trailing end and directs a second fuel towards the reaction plane. A bell engine may be used in conjunction with the aerospike engine in outer space for optimal engine efficiency.

U.S. Pat. No. 6,205,770 to Williams et al. discloses a rocket engine which comprises first and second rotary injectors for injecting respective fuel and oxidizer propellant components into a first combustion chamber. The effluent therefrom drives a turbine that rotates the rotary injectors. The rotary injectors are adapted so as to isolate the low pressure propellant supply from the relatively high pressures in the respective combustion chambers.

U.S. Pat. No. 6,220,016 to Defever et al. discloses a rocket engine which comprises first and second combustion chambers with respective combustion chamber liners bounding respective annular passages. The first combustion chamber discharges into the second and the respective annular passages are in fluid communication with one another.

U.S. Pat. No. 5,622,046 to Michaels et al. discloses a multiple impinging stream vortex injector assembly wherein a multiple impinging stream vortex injector combines two mixing schemes into a single injector. Both first stage mixing or turbulent vortex mixing is accomplished by impinging momentum balanced, tangentially injected propellant streams onto one another.

U.S. Pat. No. 4,936,091 to Schoenman discloses a method for operating a rocket engine by injecting fuel and oxidizer into an elongated combustion chamber in two flows, viz., a core flow where the fuel and oxidizer are intimately mixed and immediately combusted, and a peripheral curtain flow which surrounds the core flow. The curtain flow is in contact with the combustion chamber wall to cool it and limit the heat transfer from the wall to the injector to prevent vapor locks in the injector.

SUMMARY OF THE INVENTION

In accordance with the invention, an altitude-compensating, axisymmetrical, rocket engine assembly is provided for vertically launched vehicles which offers substantial advantages over prior art engine assemblies. More particularly, vehicle performance is improved 10–15% over engines using conventional nozzles, and, in this regard, the invention solves both of the problems discussed above (the thrust vector control problem and the inherent combustion stability problem) and results in a light weight, high performance vertical liftoff launcher.

In accordance with a first aspect of the invention, there is provided a rocket engine housing including at least two combustion chambers each including an outlet end defining a sonic throat area; means for supplying a propellant to said at least two combustion chambers including throttling injector means, associated with each of said at least two combustion chambers and located upstream of said sonic throat area, for receiving said propellant and for injecting said propellant into the associated combustion chamber; and control means for selectively controlling the throttling injector means for each of said at least two combustion chambers so that said at least two chambers provide a vectorable net thrust.

Preferably, the rocket engine assembly further comprises expansion means located downstream of said sonic throat area for providing expansion of combustion gases produced by said at least two combustion chambers so as to increase the net thrust. In one preferred embodiment, the expansion means comprises an expansion nozzle. In an alternative preferred embodiment, the expansion means comprises an aerospike body. In one preferred implementation, the expansion means comprises a fixed position exhaust nozzle but, as described below, a movable nozzle can also be employed.

In one preferred embodiment, the at least two chambers are disposed in side-by-side relation. In an advantageous implementation, four combustion chambers arranged in a cluster in side-by-side relation.

The injector means preferably comprises a coaxial pintle injector disposed coaxial with the associated combustion chamber. Advantageously, the injector means comprises at least one movable element for providing flow modulation of the propellant.

According to a second aspect of the invention, there is provided a rocket engine assembly for a vertically launched vehicle, comprising a rocket engine housing defining at least two combustion chamber disposed in side-by-side relation and each including an outlet; means defining a sonic throat area at the outlet of each the at least two combustion chambers; propellant supply means for separately supplying an oxidizer and fuel to said combustion chambers; throttling injector means, associated with each of said combustion chambers located downstream of said sonic throat area, for receiving said oxidizer and fuel and for injecting said oxidizer and fuel into the associated combustion chamber; and control means for selectively controlling said throttling injector means of each of said combustion chambers to provide a vectorable net thrust.

As indicated above, the assembly preferably comprises expansion means located downstream of said sonic throat area for providing expansion of combustion gases produced by said at least two combustion chambers. As also was described previously, expansion means comprises an expansion nozzle or an aerospike body, and can comprise a fixed position exhaust nozzle.

In accordance with yet another aspect of the invention, there is provided a rocket engine assembly for a vertically launched rocket vehicle, comprising a rocket engine housing including at least two combustion chambers each including an outlet end defining a sonic throat area; propellant supply means for supplying a propellant to said at least two combustion chambers, said propellant supply means including injector means, associated with each of said at least two combustion chambers and located upstream of said sonic throat area, for receiving said propellant and for injecting said propellant into the associated combustion chamber; modulation means for modulating the flow rate of said propellant to each of said at least two combustion chambers; control means for selectively controlling said modulator means for each of said at least two combustion chambers so that said at least two chambers provide a vectorable net thrust; and expansion means, such as an expansion body or an aerospike body, located downstream of said sonic throat area for providing expansion of combustion gases produced by said at least two combustion chambers so as to increase said net thrust.

In one preferred implementation, modulation means comprises a control valve located in a propellant supply pipe upstream of said injector means. In another preferred implementation, the modulator means comprises a movable element of said injector means which is controlled by said control means.

Further features and advantages of the present invention will be set forth in, or apparent from, the detailed description of preferred embodiments thereof which follows.

DESCRIPTION OF THE PREFERRED EMBODIMENTS

Figure 1:
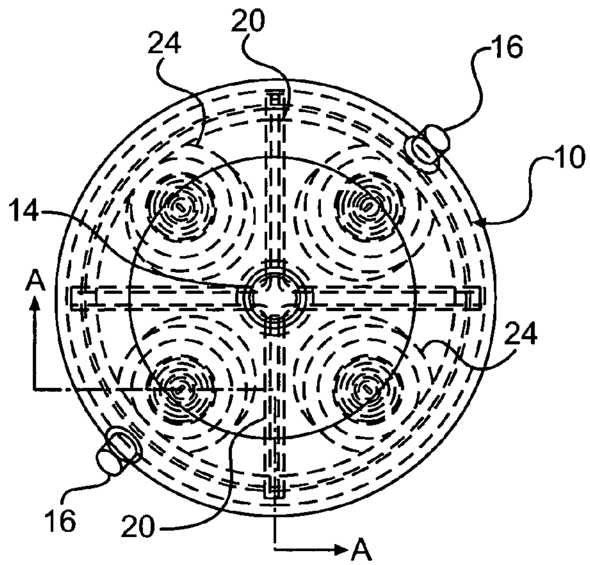
FIG. 1 is a schematic top plan view of a rocket engine assembly in accordance with a first preferred embodiment of the invention.
Figure 2:
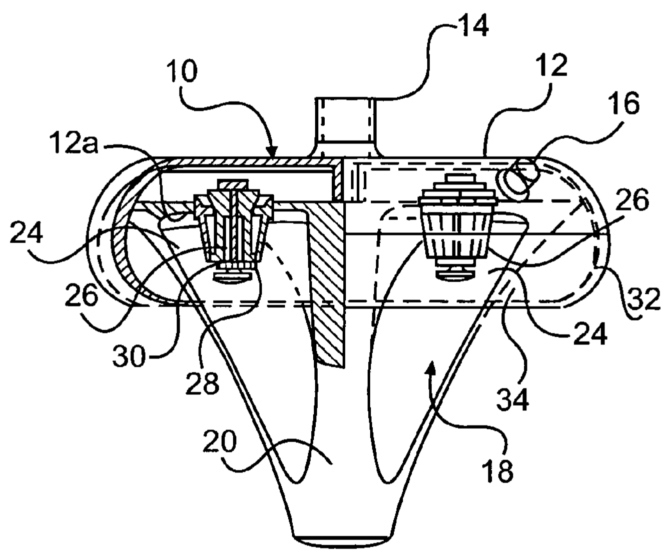
FIG. 2 is a schematic cross sectional view, taken generally along line A—A of FIG. 1.
Figure 3:
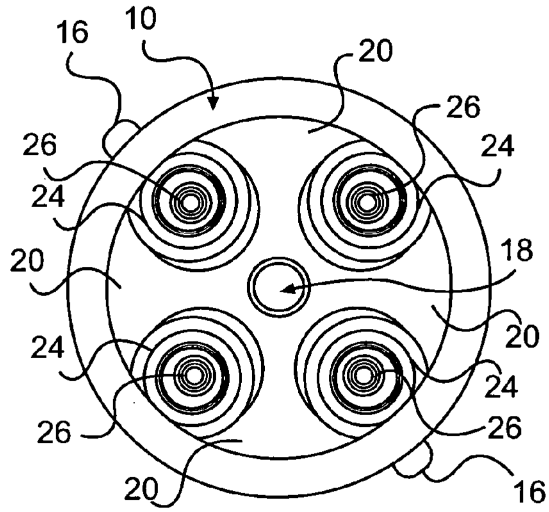
FIG. 3 is a schematic bottom plan view of the engine assembly of FIG. 1.

Referring first to FIGS. 1–3, a first embodiment of the rocket engine of the invention is shown. The rocket engine includes a housing generally denoted 10. Housing 10 includes an upper chamber or portion 12 fitted with an oxidizer inlet 14 and a pair of fuel inlets 16 (see FIGS. 1 and 2). In the embodiment of FIGS. 1–3, oxidizer inlet 14 is located at the top of engine housing 10 while the fuel inlets 16 are located on opposite sides but it will be understood that different arrangements can be used and that additional inlets can be provided, e.g., around the periphery of chamber 12.

Engine housing 10 further includes a central aerospike nozzle center body 18. As best seen in FIGS. 1 and 3, four flow interference barriers 20 divide the rocket engine housing 10 into four combustion and aerospike nozzle channels 24. As is shown in FIGS. 2 and 3, four pintle throttling propellant injectors 26 are located in a lower wall **12*a* of upper chamber 12. Injectors 26 are conventional and an exemplary embodiment of one of these injectors is schematically shown in FIG. 2 and, in more detail in FIG. 4, which is discussed below. As shown in FIG. 2, the injector 26 includes an outer, annular, generally conical oxidizer channel 28 and a central fuel channel 30 which opens laterally so that the oxidizer flows thereby. As is also shown in FIG. 2, four shaped, outwardly disposed, downwardly depending portions 32 of housing 10 each form a sonic throat 34 for a corresponding injector 26. The functions of the various elements or components of the embodiments of FIGS. 1–3 will be described below in connection with the embodiments of FIGS. 6–9**.

Figure 4:
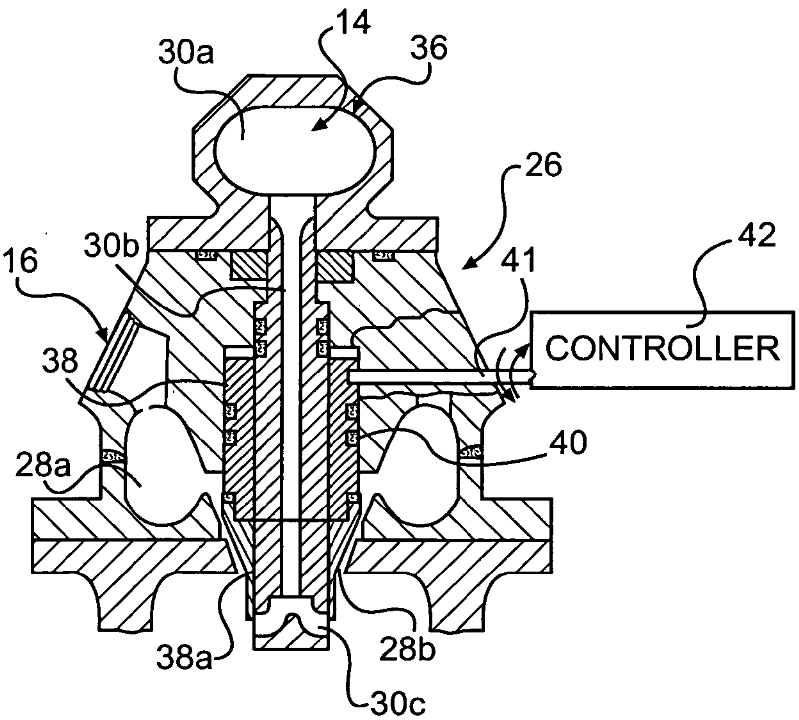
FIG. 4 is a schematic cross sectional view of an injector assembly in accordance with one preferred embodiment of the invention.

Referring to FIG. 4, schematic cross-sectional view is provided of one of the injectors 26 in FIGS. 2 and 3. The injector 26 includes a housing 36 incorporating an oxidizer inlet pipe or reservoir **30*a* which is connected to, or forms part of, oxidizer inlet 14 of FIG. 1 and which communicates with a central passage 30*b* in a movable sleeve 38. As illustrated, central passage 30*b* opens into laterally extending openings or passages 30*c* from which the oxidizer issues. Sleeve 38 is mounted for movement in a bore 40 in housing 36 and includes a generally conically shaped lower portion 38*a* located above openings 30*c***.

Housing 36 further includes an annular fuel reservoir **28*a* which is connected to, or forms part of, fuel inlet 16 of FIG. 1. Reservoir 28*a* includes an outlet passage which opens into generally frustoconical channel 28 formed between a corresponding portion of the housing 36 and the external conical surface of the lower conical portion 38*a* of sleeve 38. As is evident from FIG. 4, downward movement of sleeve 38 will close off channel or passage 28*b* and thus throttle the supply of fuel from reservoir 28*a***.

Movement of sleeve 38 is controlled by a drive member or drive shaft 41 of a controller 42 which preferably comprises a stepper motor. The connection between drive shaft 41 and sleeve 38 is such that rotation of drive shaft in a first direction provides raising of sleeve 38 and rotation of shaft 41 in the opposite direction causes lowering of sleeve 38. Of course, it will be appreciated that other arrangements or mechanisms can be used to control movement of sleeve 38 and to thus control throttling of fuel passage **28*b***.

Figure 5:
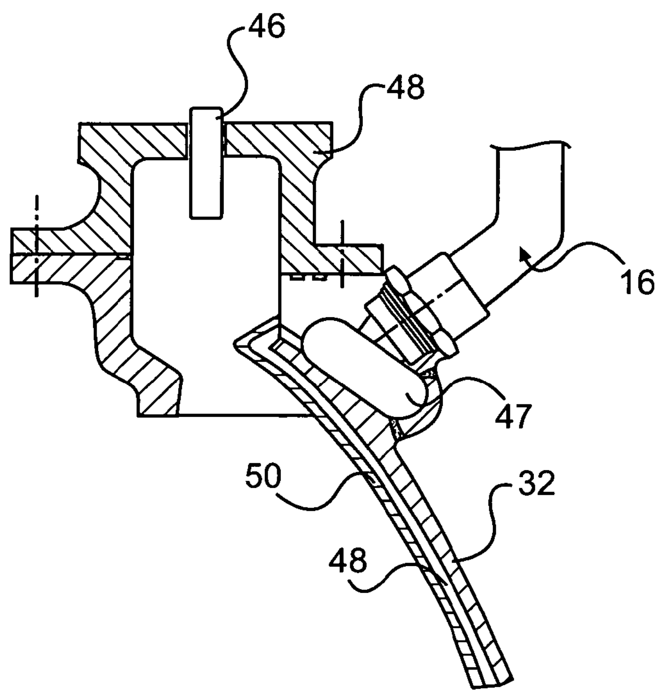
FIG. 5 is a schematic cross sectional view of a portion of the engine assembly of FIG. 2 as modified in accordance with a further embodiment.
Figure 7:
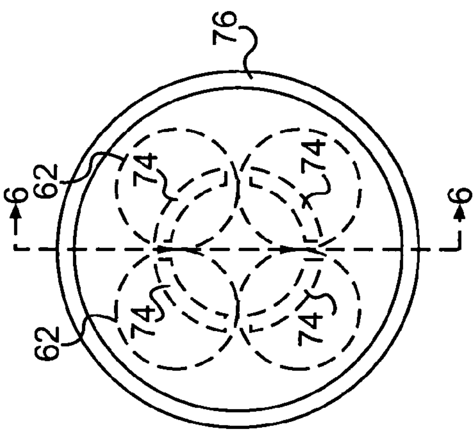
FIG. 7 is an end elevational view of the engine assembly of FIG. 6.

Referring to FIG. 5, a schematic cross section view is shown of the portion of FIG. 3 including the fuel inlet 16. As illustrated, in this embodiment, a housing 44 has incorporated therein a pintle device 46 generally corresponding to one of the injectors 26 of FIG. 1. A fuel inlet 16 corresponding to that of FIG. 1 communicates with a fuel reservoir 47 that opens into a fuel passage 48. The latter is formed between an inner wall 50 and outer wall portion corresponding to portion 32 of FIG. 1, and creates a fuel down flow.

Figure 6:
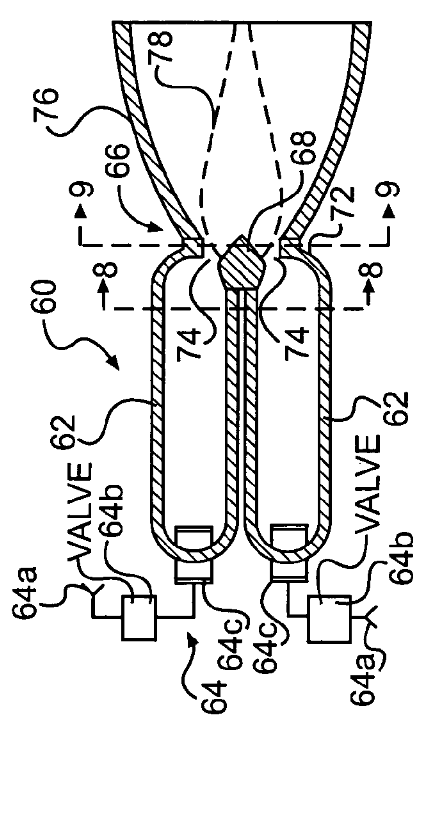
FIG. 6 is a highly schematic cross sectional view of a rocket engine assembly in accordance with a further preferred embodiment of the invention, the cross section being taken generally along line 6—6 of FIG. 7.
Figure 8:
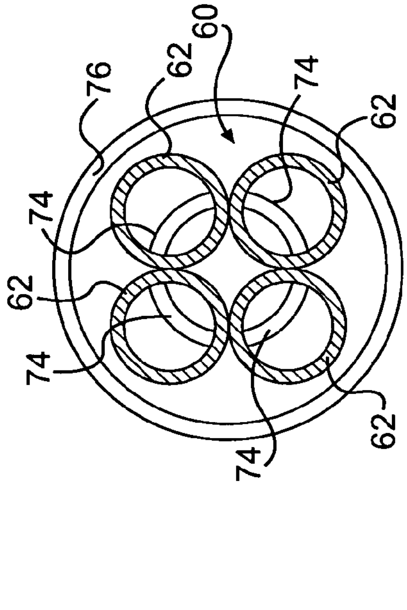
FIG. 8 is a cross sectional view taken generally along line 8—8 of FIG. 6.

Turning to FIGS. 6–9, there is shown, in a highly schematic manner, a further embodiment of the invention. The embodiment shown in FIGS. 6–9 perhaps more clearly illustrates the basic principles of the invention and these principles will be described below in connection with this embodiment. As illustrated, the rocket engine assembly, which is generally denoted 60, includes four elongate combustion chambers 62 arranged in a closely spaced cluster with their longitudinal axes extending in parallel with each other. As indicated above, although four combustion chambers are shown in the embodiment of FIGS. 6–9, two or more combustion chambers can be used. A propellant feed arrangement 64 is provided for each of the chambers 62 as shown in FIG. 6. Each feed arrangement includes a propellant feed inlet connection 64*a*, a control valve 64*b* and an injector assembly 64*c*. Each injector assembly 64*c* is located at the proximal end of the corresponding combustion chamber 62 and, as described above, is used to provide controlled throttling of the propellant supplied to the associated combustion chamber 62. The injector assemblies 64*c* are themselves of a conventional constructions per se.

Figure 9:
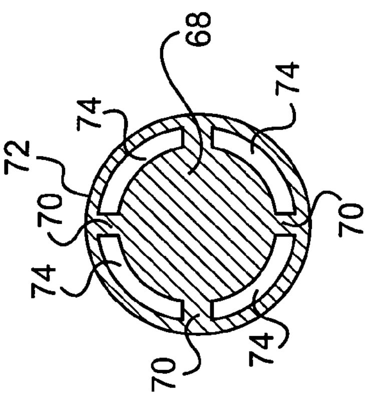
FIG. 9 is a cross sectional view taken generally along line 9—9 of FIG. 6.

A sonic throat area 66 is provided at the opposite, distal outlet ends of chambers 62. As best seen in FIGS. 6 and 9, the chambers 62 neck down, i.e., are of reduced diameter, in throat area 66, and a central, common, shaped support element 68 is provided at the junction of the inner walls of chambers 62. Support element 68 is connected by struts 70 to a common other wall 72 of combustion chambers 62 formed at the necked down area so as to create four exhaust ports 74 for the four chambers 62.

A tapered, generally conical or bell-shaped expansion nozzle 76 is disposed outwardly of sonic throat area 66. Nozzle 76 is common to each of the combustion chambers 62, i.e., all of the chambers 62 open into nozzle 76 at throat area 66, and is tapered so as to expand outwardly as shown. Such expansion nozzles are, of course, conventional in rocket engines.

As indicated in dashed lines in FIG. 6, in alternative embodiment, an aerospike 78 is used to replace expansion nozzle 76. It will be appreciated that the aerospike 78 would also act as, or similarly to, a nozzle, i.e., the exhaust flow from the combustion chambers 62 will flow thereby in a flow pattern broadly similar to that provided by nozzle 76.

It will be appreciated that because the combustion chambers 62 (four in the case of FIGS. 6–9) feed a common exhaust nozzle (whether formed by expansion nozzle 76, aerospike nozzle 78 or some other nozzle configuration), thrust vectoring of rocket engine 60 can be controlled by selectively controlling the propellant throttling provided by the various injector assemblies 64*c*.

It will also be appreciated from the foregoing that the rocket engine assembly described above is capable of provided vectorable net thrust without the need for a movable engine assembly, a movable nozzle or movable control elements (e.g., vanes, tabs or the like) to deflect or control the exhaust gases. In the preferred embodiments described above, two, four or more separation combustion chambers are employed which communicate with a single, fixed geometry, fixed position exhaust nozzle, with this communication occurring downstream of the sonic throat section 66, as illustrated in the drawings and described above. However, in an alternative embodiment, two or more of the separate combustion chambers can be in communication with a variable geometry, movable position exhaust nozzle, with the invention providing increased steering thrust beyond that solely available from the movable nozzle alone.

As was also described above, each combustion chamber 62 is preferably fed propellants by means of a coaxial pintle injector 64*c*, such as that discussed above, in connection with the earlier described embodiment, disposed at the head or proximal end of the corresponding combustion chamber 62, this end being located generally opposite the end containing the sonic thrust section 66. The coaxial pintle injector 64*c* of one or more of the chambers 62 is preferably used to modulate the propellant flow rate into the corresponding chamber 62 and thus modulate the corresponding thrust contributed by that chamber 62, as was described above in connection with, e.g., FIG. 4.

This propellant flow rate modulation is advantageously achieved by on-off pulsing of the pintle injector element (e.g., an element corresponding to sleeve 38 of FIG. 4) or by variable positioning of one or more movable elements within the pintle injector (e.g., variable positioning of sleeve 38 or of two or more similar throttling control elements) or by variable positioning (including, among other implementations, on-off pulsing of) propellant control valves (corresponding to valves 64*b*) located in the propellant feed plumbing upstream of the coaxial pintle injector.

As described hereinbefore, each combustion chamber is fed propellants by means of an injector at the head end of the chamber, as is illustrated in FIG. 6, with the injector being indicated at 64*c* and, in one important implementation, the injector is a distributed, multi-element injector. This type of injector includes conventional injectors referred to as doublets, triplets, coaxial injectors, coaxial shear injectors, coaxial swirl injectors and coaxial shear swirl injectors. The same techniques described above in the preceding paragraph can be used to provide modulation of the propellant flow rate and thus the thrust.

As shown, e.g., in FIG. 9, in one important embodiment, the sonic throat sections 74 of the individual combustion chambers 62 are arranged to form annulus that provide exhaust products to a single downstream nozzle or body 76 (or 78).

As was discussed above in connection with FIG. 6, in one preferred embodiment, the nozzle employed comprises a conventional conical or bell-shaped expansion nozzle corresponding to that shown at 76 which creates supersonic expansion and increased thrust, as compared with the aggregate thrust available at the sonic throat sections 74 of the individual combustion chambers 62. As also described above in connection with FIG. 6, the downstream nozzle or body can also comprise an aerospike nozzle corresponding to that shown at 78 which provides free expansion for altitude compensation to optimize performance. It is also noted that the expansion nozzle or body could comprise a conventional expansion deflection nozzle (not shown) which would provide engine altitude compensation so as to optimize performance in this way.

Although specific shapes and geometries have been illustrated in the drawings, it is also to be understood that the sonic throat cross sections (as shown, e.g., at 74) can be of various different shapes, and can be arranged in various different geometric locations with respect to each other. However, in each case, the sonic throat section should be positioned so as to communicate combustion chamber gases to a single downstream expansion nozzle or body so as to create supersonic expansion and increased thrust as described above.

Although the invention has been described above in connection with preferred embodiments thereof, it will be understood by those skilled in the art that variations and modifications can be effected in these preferred embodiments without departing from the scope and spirit of the invention.

What is claimed is:

1. A rocket engine assembly for a vertically launched vehicle, said assembly comprising:

a rocket engine housing including at least four combustion chambers arranged in an axisymmetric configuration, each of said combustion chambers including an outlet end defining a sonic throat area;

means for supplying a propellant to said at least four combustion chambers including throttling injector means, individually associated with each of said at least four combustion chambers and located upstream of said sonic throat area, for receiving said propellant and for injecting said propellant into the associated combustion chamber, said injector means comprising a coaxial pintle injector disposed coaxially with the associated combustion chamber and located wholly upstream of said sonic throat area;

expansion means located downstream of said sonic throat area for providing expansion of combustion gases produced by said at least four combustion chambers, said expansion means comprises an expansion nozzle including a central aerospike body; and control means for selectively controlling the throttling injector means for each of said at least four combustion chambers so that said at least four chambers provide a vectorable net thrust.

2. An assembly as claimed in claim 1 wherein said at least four chambers are disposed in a cluster in side-by-side relation.

3. An assembly as claimed in claim 1 wherein said pintle injector comprises at least one movable element for providing flow modulation of the propellant.

4. A rocket engine assembly for a vertically launched rocket, said assembly comprising:

a rocket engine housing defining at least four combustion chamber disposed in an axisymmetric cluster in side-by-side relation and each including an outlet;

means defining a sonic throat area at the outlet of each the at least four combustion chambers;

propellant supply means for separately supplying an oxidizer and fuel to said combustion chambers;

throttling injector means, associated with each of said combustion chambers located upstream of said sonic throat area, for receiving said oxidizer and fuel and for injecting said oxidizer and fuel into the associated combustion chamber, said injector means comprising a coaxial pintle injector disposed coaxially with the associated combustion chamber and located wholly upstream of said sonic throat area;

expansion means located downstream of said sonic throat area for providing expansion of combustion gases produced by said at least four combustion chambers, said expansion means comprises an expansion nozzle including a central aerospike body; and control means for selectively controlling said throttling injector means of each of said combustion chambers to provide a vectorable net thrust.

5. A rocket engine assembly for a vertically launched rocket vehicle comprising:

a rocket engine housing including at least four combustion chambers each including an outlet end defining a sonic throat area;

propellant supply means for supplying a propellant to said at least four combustion chambers, said propellant supply means including injector means, associated with each of said at least four combustion chambers and located upstream of said sonic throat area, for receiving said propellant and for injecting said propellant into the associated combustion chamber, said injector means comprising a coaxial pintle injector disposed coaxially with the associated combustion chamber and located wholly upstream of said sonic throat area;

modulation means for modulating the flow rate of said propellant to each of said at least four combustion chambers;

control means for selectively controlling said modulator means for each of said at least four combustion chambers so that said at least four chambers provide a vectorable net thrust; and expansion means located downstream of said sonic throat area for providing expansion of combustion gases produced by said at least four combustion chambers so as to increase said net thrust, said expansion means comprising an aerospike body.

6. An assembly as claimed in claim 5 wherein said modulation means comprises a control valve located in a propellant supply pipe upstream of said injector means.

7. An assembly as claimed in claim 5 wherein said modulator means comprises a movable element of said pintle injector controlled by said control means.

* * * * *